United States Patent Office 2,925,441
Patented Feb. 16, 1960

2,925,441

METHOD OF PREPARING ORGANOBORON COMPOUNDS

Herbert C. Brown, West Lafayette, Ind.

No Drawing. Application October 30, 1958
Serial No. 770,618

10 Claims. (Cl. 260—606.5)

This invention relates to the preparation of organoboron compounds and more particularly to the preparation of organoboron compounds having the formula $R_3B$ in which R is a saturated hydrocarbon radical, such as an alkyl radical.

Hurd (Jour. Am. Chem. Soc., 70, 2053 (1948)) has reported that gaseous diborane may be reacted with a large excess of olefinic hydrocarbons in sealed tubes at 100° C. for extended periods of time. Thus, a mixture of triisobutylboron and tri-t-butylboron was obtained by the reaction of isobutylene and diborane in a sealed tube at 100° C. for 24 hours. Reaction of ethylene with diborane at 100° C. for 96 hours produced tri-ethylboron.

R. S. Brokaw and R. N. Pease (Jour. Am. Chem. Soc., 72, 3237 (1950); ibid., 72, 5263 (1950)) have reported that gaseous olefins, such as ethylene, propylene and 1-butene, react with aluminum borohydride at elevated temperatures to form trialkylborons along with mixed alkyl-aluminum hydrides. Thus, the reaction of ethylene with aluminum borohydride at 140° C. is postulated to be $$Al(BH_4)_3 + 4C_2H_4 \rightarrow (C_2H_5)_3B + C_2H_5Al(BH_4)_2$$

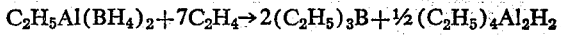

Aluminum borohydride is a volatile liquid, B.P. 45° C., which is exceeding difficult and hazardous to handle. Small amounts of the liquid or vapor in contact with the atmosphere result in violent explosions. Thus, the publication by Gaylord, Reduction with Complex Metal Hydrides, Interscience Publishers, New York city, 1956, on page 26 states "Aluminum borohydride is an extremely hazardous material. The vapor of the compound ignites spontaneously on exposure to air containing only traces of moisture." The same publication on page 103 states "The extreme reactivity of the compound, including spontaneous ignition on exposure to moist air and the explosive reaction with water, preclude any widespread utilization of reagent in organic reductions."

The present invention is based upon the discovery that complexes of aluminum borohydride with ethers, tertiary amines, or thioethers react with remarkable ease with unsaturated organic compounds, such as olefins, to form organoboron compounds. The reaction is complete in a few minutes at room temperature. In fact, the vigor of the reaction is such that the olefin must be added slowly to the reaction mixture in order to avoid a too rapid reaction with its concurrent development of heat. The reactions are illustrated by the following equations:

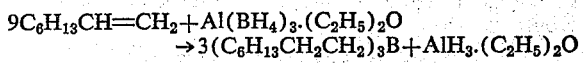
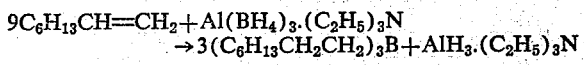
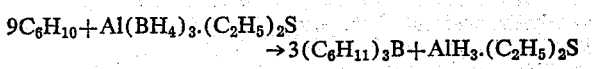

The complexes of aluminum borohydride may be formed by well known procedures by the interaction at suitable low temperatures of equimolar quantities of aluminum borohydride and the complexing agent, namely any ether, tertiary amine or thioether. Preferably, the complexing agent is an ether, tertiary amine or thioether which is liquid at room temperatures and has a boiling point substantially different from that of the organoboron compound to be prepared. Illustrative complexing agents are diethyl, dipropyl, diisopropyl ethers, anisole, tetrahydrofuran, dimethylether of diethyleneglycol, the corresponding thioethers, and tertiary amines, such as trimethyl, triethyl, tripropylamine, dimethylaniline, pyridine, N-ethyl-morpholine, etc. These complexes are soluble in an excess of the complexing agent and, in general, are soluble in saturated paraffinic, saturated alicyclic and aromatic hydrocarbon solvents. Stable chlorinated and brominated aromatic solvents, such as chlorobenzene and bromobenzene, are also suitable. The complexing group is easily displaced from these complexes and, consequently, if a given complex is dissolved in another complexing agent, an equilibrium mixture of two different complexes is obtained.

These complexes of aluminum borohydride are far less volatile than aluminum borohydride itself and are far safer to handle. Thus a solution in diethyl ether of the complex aluminum borohydried with diethyl ether can be poured in open air without special precautions. Similarly, solutions of the aluminum borohydride-tetrahydrofuran complex in tetrahydrofuran and of the dimethyl-ether of diethyleneglycol-aluminum borohydride complex in dimethylether of diethyleneglycol can be handled without special precautions. Likewise, it is possible to prepare and handle solutions of these complexes in hydrocarbon solvents or other inert liquids, providing there is present at least one mole of the complexing agent per mole of aluminum borohydride.

In the preparation of organoboron compounds by the method of the invention it is preferred to associate the reactants, namely the unsaturated organic compound and the complex aluminum borohydride in a liquid carrier wihch may be an inert non-solvent for the complex or an inert solvent therefor, such as a hydrocarbon or stable haloaromatic solvent, or a liquid capable of forming one of the above mentioned complexes with aluminum borohydride. In many instances the complex of aluminum borohydride is a liquid and may serve at least in part as the liquid carrier. Similarly, an organoboron compound obtained from a previous run may serve at least in part as the liquid carrier. The organoboron compound can be recovered from the reaction liquor by either of two procedures. By one procedure, the reaction liquor is permitted to stand and the by-product aluminum hydride complex precipitates and can be separated by filtration or decantation. The organoboron compound can be recovered from the resulting liquor by distillation. By the second procedure, water may be added to the reaction liquor to destroy the aluminum hydride and the organoboron compound can be recovered from the resulting liquor by distillation.

The aluminum hydride complex readily reacts with diborane at room temperature to form the corresponding complex of aluminum borohydride as illustrated by the following equation:

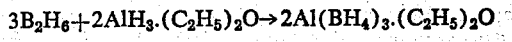

Consequently, it is possible to carry out a two-stage process in which the aluminum borohydride complex is reacted with the unsaturated organic compound in one stage and then the by-product aluminum hydride complex is removed from the reaction liquor as previously described and reacted with diborane in a liquid carrier to form the complex of aluminum borohydride.

If desired, in the practice of the invention the complex of aluminum borohydride may be formed concurrently with the reaction of the complex with the unsaturated organic compound. Thus, a very small amount of the aluminum borohydride complex may be introduced initially into the reaction vessel along with the unsaturated organic compound in the liquid carrier. This small amount of complex reacts to form small amounts of the organoboron compound and the complex of aluminum hydride. Diborane is introduced to convert the aluminum hydride complex to the complex of aluminum borohydride. Diborane is introduced continuously and this cycle is repeated until the reaction with the unsaturated organic compound is complete. In place of the small amount of aluminum borohydride complex used initially, a small amount of aluminum borohydride or a material which is readily converted to aluminum borohydride by diborane may be used if a small amount of a complexing agent is present in the reaction vessel. Examples of such materials are aluminum hydride, aluminum alkyls, mixed alkylaluminum halides and the metallic aluminum hydrides such as lithium or magnesium aluminum hydrides and their alkyl derivatives.

The invention particularly contemplates the conversion of olefins, such as 1-pentene, 2-pentene, 1-hexene, 1-octene, diisobutylene, cyclopentene, cyclohexene, styrene, $\beta,\beta$-diphenylethylene, etc., to organoboron compounds having the formula $R_3B$ in which R represents a saturated hydrocarbon radical. However, the invention is applicable broadly for conversion to organoboron compounds of other unsaturated organic compounds including dienes such as butadiene and cyclohexadiene, acetylenes such as 1-hexyne and 2-hexyne, and substituted olefins such as m-nitrostyrene, nitroethylene, allyldimethylamine, vinylpyridine, allylethylether, vinylbutylether and allylethylsulfide. The unsaturated organic compound used preferably should not contain a substituent which is reduced by the aluminum borohydride complex.

The term "unsaturated" as used herein is intended to refer to organic compounds which owe their unsaturation to the presence of an olefinic double bond or an acetylenic triple bond although such compounds may also contain an aromatic ring. Conversely, the term "saturated" as used herein is not intended to exclude simple aromatic compounds or aromatics having one or more aliphatic or alicyclic radicals. Aromatic rings do not add bromine at room temperature whereas the other derivatives react readily.

The invention is illustrated further by the following examples.

*Preparation of tri-n-pentylboron in diethylether*

In a dry one liter flask was placed 0.33 mole of aluminum borohydride-diethyl ether complex in 400 ml. of diethyl ether. The flask was stirred with a magnetic stirrer. A nitrogen atmosphere was maintained. 3.0 mole of 1-pentene was dissolved in diethyl ether and added through a dropping funnel at such a rate as to maintain a gentle reflux. When all of the olefin had been added, water was cautiously added to destroy the aluminum hydride. The ether layer was recovered (nitrogen atmosphere), and the product was distilled under reduced pressure after stripping the ether. There was obtained 190 grams of tri-n-pentylboron, B.P. 94–95° C. at 2 mm., a yield of 85 percent.

Identical procedures were utilized for the reaction of 1-octene, 1-hexene, cyclohexene, cyclopentene, diisobutylene, styrene and $\beta,\beta$-diphenylethylene. In all cases, 70–90% yields of the trialkylboron were realized.

*Preparation of tricyclohexylboron in dimethylether of diethyleneglycol*

The procedure was similar to that in the previous preparations in diethyl ether with two slight modifications. Because of the high boiling point of the solvent, external cooling was utilized to maintain the temperature at 25°–35° C. Water was used to wash the solvent from the product. From 0.1 mole of aluminum borohydride complex with the dimethylether of diethyleneglycol and 0.9 mole of cyclohexene there was obtained 79% yield of tricyclohexylboron, B.P. 130°–132° C. at 2 mm.

*Preparation of tricyclopentylboron in tetrahydrofuran*

The procedure was similar to those previously described. From 0.1 mole of aluminum borohydride and 0.9 mole of cyclopentene was obtained a 72% yield of tricyclopentylboron, B.P. 118°–120° C. at 2 mm.

*Preparation of tri-n-octylboron in inert solvents*

0.1 mole of the diethylether complex of aluminum borohydride was added to 200 ml. of n-heptane. To this solution was added 0.9 mole of 1-octene, maintaining the temperature below 50° C. The product was distilled under vacuum. There was obtained a 75% yield of tri-n-octylboron, B.P. 144°–146° C. at 2 mm. Similar results were obtained with tetrahydrofuran, anisole, and dimethylether complexes.

The reaction was repeated, but 0.1 mole of triethylamine and 0.1 mole of aluminum borohydride was added to the n-heptane. An 82% yield of tri-n-octylboron was obtained. N-ethylmorpholine, diethylaniline and pyridine yielded similar results.

Finally a preparation was carried out using 0.1 mole of diethylsulfide and 0.1 mole of aluminum borohydride in n-heptane. A yield of 80% of tri-n-octylboron was obtained.

Similar preparations were carried out in cyclohexane, decalin, benzene, xylene and chlorobenzene as solvent. In all cases the reaction proceeded smoothly. Petroleum fractions free of unsaturates were also satisfactory.

*Preparation of tri-n-octylboron using concurrently formed aluminum borohydride complex*

A solution of 0.01 mole of aluminum borohydride in 500 ml. of diethyl ether was treated with 1.0 mole of 1-octene. To the vigorously stirred reaction mixture was added 0.2 mole of diborane. The diborane was rapidly absorbed as fast as it could be generated and passed into the ether solution. The reaction mixture was washed with water and distilled under reduced pressure. There was obtained 103 grams of tri-n-octylboron, the yield being 88 percent.

The preparation was repeated using tetrahydrofuran and 0.01 mole of aluminum hydride, prepared from lithium aluminum hydride and aluminum chloride. Again the diborane was rapidly absorbed and the 1-octene was converted almost quantitatively to tri-n-octylboron.

Ethylaluminum sequibromide and lithium aluminum hydride with diborane likewise brought about a rapid conversion of olefin to organoboron.

Trimethylaluminum, 0.01 mole, was added to tetrahydrofuran together with 1-octene and diborane passed in. Again a rapid reaction was observed which was complete in less than 60 minutes.

In a separate experiment pure 1-octane was treated with diborane at 25° C. In spite of the much higher concentration involved in the use of pure octane, the absorption of diborane in one hour was less than 10% of the quantity estimated for reaction to form tri-n-octylboron.

*Conversion of butadiene*

0.01 mole of aluminum borohydride-diethyl ether complex was dissolved in diethyl ether. This solution was slowly dropped into a solution of 0.1 mole of butadiene in diethyl ether. After the reaction was complete, the reaction mixture was treated with water and the ether layer was separated. The ether was removed on a steam bath. The oily organic layer contained both boron and unsaturation. It reacted rapidly with bromine and with oxygen.

Conversion of 3-hexyne 0.1 mole of 3-hexyne was treated in the same manner as in the case of butadiene. After hydrolysis and removal of the solvent, there was obtained 18 grams of an oily liquid which contained boron and showed unsaturation toward bromine.

Conversion of allyldiethylamine

Allyldiethylamine, 0.1 mole, was treated with aluminum borohydride-diethyl ether complex. After hydrolysis, there was obtained an oily liquid containing both boron and nitrogen. The compound was soluble in both strong base and in aqueous acid.

Preparation of tri-γ-chloropropylborane

*Allyl chloride.*—A solution of 1.0 mole of allyl chloride in 200 ml. of ethyl ether was treated over a period of an hour with a solution of 0.1 mole of aluminum borohydride-ethyl ether complex in the same solvent. The reaction mixture was allowed to stand for one hour, then hydrolyzed. The hydrogen evolved was 0.3 mole, indicating 90% reaction. The ether layer was separated, the ether stripped off on the steam bath, and the product obtained as an oily liquid containing both boron and chlorine. Oxidation of the product yielded trimethylene chlorohydrin in an overall yield of 75%.

*Oleic acid.*—A solution of 1.0 mole of oleic acid in 200 ml. of ethyl ether was slowly added over a period of two hours to a solution of 0.5 mole of aluminum borohydride-ethyl ether in 200 ml. of ethyl ether. Hydrogen was evolved in the initial stages of the reaction as the acid hydrogen of the carboxylic acid reacted with the reagent. After two hours at room temperature, the product was hydrolyzed. Approximately 2.0 moles of hydrogen was evolved, corresponding to the utilization of four moles by the compound. The reaction product was an oily liquid corresponding to the composition $(HOC_{18}H_{36})_3B$, which could not be distilled at temperatures up to 200° at 0.1 mm. It was oxidized and identified as a mixture of octadecylene glycols,

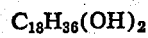

$$C_{18}H_{36}(OH)_2$$

It was concluded that the reagent simultaneously converted the double bond to an organoborane in the usual manner and reduced the carboxyl group to the alcohol stage.

In the same manner, ethyl oleate was converted into the eighteen carbon atom glycol, allyl acetic acid was converted into the 1,4-glycol, allyl cyanide into the 1,4-tetramethylene aminoalcohol, crotonaldehyde into the corresponding glycol, $C_4H_8(OH)_2$, and mesityl oxide, $(CH_3)_2C=CHCOCH_3$, into the corresponding glycol, $C_6H_{12}(OH)_2$.

Thus unsaturated bonds may be hydroborated by the reagent in compounds containing groups reducible by the reagent, provided sufficient reagent is present to both reduce the group and hydroborate the unsaturated linkage.

The reagent hydroborates unsaturated linkages of all types, including ethylene and acetylene and the various hydrocarbon derivatives of the types: $RCH=CH_2$, $R_2CH=CH_2$, $RCH=CHR$, $R_2C=CHR$, $R_2C=CR_2$, $R-C\equiv CH$, and $R-C\equiv C-R$, where R is the same or different hydrocarbon radicals, including aliphatic, aromatic and alicyclic groups which may contain one or more non-reducible groups, or reducible groups provided the reagent is used in sufficient quantity to both reduce the group or groups and the unsaturated bonds.

This application is a continuation in part of my copending application, Serial No. 630,017, filed December 24, 1956, now abandoned.

I claim:

1. In a method of preparing an organoboron compound, the step which comprises reacting an aluminum borohydride complex with an organic compound selected from the group consisting of olefins, cycloolefins, dienes, alkynes, arylalkenes, nitroaryl alkenes, nitroalkenes, alkenyl-amines, alkenyl ethers, alkenyl sulfides, pyridine alkenes, haloalkenes, alkenoics, alkyl alkenoates, alkenyl nitriles and alkenals. thereby forming an organoboron compound and an aluminum hydride complex, said aluminum borohydride complex being a complex with a complexing agent selected from the group consisting of an ether, a tertiary amine and a thioether which is inert toward said organic compound and said organoboron compound and which is capable of forming said complex with aluminum hydride.

2. The method claimed by claim 1 wherein the reaction is conducted in an inert liquid carrier.

3. The method claimed by claim 2 wherein diborane is introduced into the liquid carrier to convert the complex of aluminum hydride to the complex of aluminum borohydride.

4. The method claimed by claim 2 wherein the inert liquid carrier consists essentially of a non-solvent for the aluminum borohydride complex.

5. The method claimed by claim 2 wherein the inert liquid carrier consists essentially of a saturated hydrocarbon.

6. The method claimed by claim 2 wherein the inert liquid carrier consists essentially of a solvent for the aluminum borohydride complex.

7. The method of preparing an organoboron compound having the formula $R_3B$ in which R represents a saturated hydrocarbon radical which comprises reacting an aluminum borohydride complex with a hydrocarbon containing an olefinic bond thereby forming said organoboron compound and an aluminum hydride complex, said aluminum borohydride complex being a complex with a complexing agent selected from the group consisting of an ether, a tertiary amine and a thioether which is inert toward said organic compound and said organoboron compound and which is capable of forming said complex with aluminum hydride.

8. The method claimed by claim 7 wherein the reaction is conducted in a liquid medium which consists essentially of an excess of said complexing agent.

9. The method claimed by claim 7 wherein the reaction is conducted in an inert liquid carrier.

10. The method claimed by claim 7 wherein diborane is introduced into the liquid carrier to convert the complex of aluminum hydride to the complex of aluminum borohydride.

References Cited in the file of this patent

UNITED STATES PATENTS 2,858,340    Clark et al.    Oct. 28, 1958